(12) United States Patent
Radatti

(10) Patent No.: US 8,266,113 B2
(45) Date of Patent: Sep. 11, 2012

(54) METHODS, APPARATUS AND ARTICLES OF MANUFACTURE FOR COMPUTER FILE INTEGRITY AND BASELINE MAINTENANCE

(75) Inventor: Peter V. Radatti, Conshohocken, PA (US)

(73) Assignee: Cybersoft, Inc., Conshohocken, PA (US)

( * ) Notice: Subject to any disclaimer, the term of this patent is extended or adjusted under 35 U.S.C. 154(b) by 0 days.

(21) Appl. No.: 10/404,378

(22) Filed: Apr. 1, 2003

(65) Prior Publication Data
US 2004/0199508 A1 Oct. 7, 2004

(51) Int. Cl.
*G06F 17/00* (2006.01)
(52) U.S. Cl. .................. 707/690; 707/692; 707/696
(58) Field of Classification Search .............. 707/200, 707/203, 690, 692, 698
See application file for complete search history.

(56) References Cited

U.S. PATENT DOCUMENTS

| | | | | |
|---|---|---|---|---|
| 5,475,826 A | * | 12/1995 | Fischer | 707/1 |
| 5,638,446 A | * | 6/1997 | Rubin | 705/51 |
| 5,694,569 A | * | 12/1997 | Fischer | 711/216 |
| 5,919,257 A | * | 7/1999 | Trostle | 726/22 |
| 6,122,738 A | * | 9/2000 | Millard | 713/187 |
| 6,415,280 B1 | * | 7/2002 | Farber et al. | 707/2 |
| 6,418,452 B1 | * | 7/2002 | Kraft et al. | 707/200 |
| 6,493,871 B1 | * | 12/2002 | McGuire et al. | 717/173 |
| 2001/0037323 A1 | * | 11/2001 | Moulton et al. | 707/1 |
| 2001/0042171 A1 | * | 11/2001 | Vermeulen | 711/118 |
| 2002/0133611 A1 | * | 9/2002 | Gorsuch et al. | 709/231 |
| 2003/0110296 A1 | * | 6/2003 | Kirsch et al. | 709/246 |

OTHER PUBLICATIONS

Kim et al., "The Design and Implementation of Tripwire: A File System Integrity Checker", Nov. 19, 1993, COAST laboratory, Department of Computer Sciences, Purdue University, 21 pages.*
CyberSoft, Inc., CIT, Dec. 2001, 3 pages printed from http://web.archive.org/web/20011123205923/http://www.cybersoft.com/products/cit.shtml on Oct. 4, 2005.*
Radatti, Peter V., "Secrets of the VFind Security Tool Kit Professional Plus" Version 1.00, Feb. 2000, 14 pages.
CyberSoft, Inc., "CIT Cryptographic Integrity Tool", Version 1.0, Apr. 1996, 9 pages.

* cited by examiner

*Primary Examiner* — Wilson Lee
*Assistant Examiner* — Michael Le
(74) *Attorney, Agent, or Firm* — John F. A. Earley, III; Frank J. Bonini, Jr.; Harding, Earley, Follmer & Frailey, P.C.

(57) ABSTRACT

Apparatus, methods and articles of manufacture for file integrity and baseline maintenance on a computer system or systems are shown. A file integrity check is made of files on a system by hashing the files and comparing the hash to a stored hash of the files. If the comparison is false, the system requests a copy of the file from a server, which may be unknown or untrusted. The system then compares the received file to the stored hash. If the comparison is true, the copy of the file will be installed on the system. If false, the system repeats the request.

36 Claims, No Drawings

METHODS, APPARATUS AND ARTICLES OF MANUFACTURE FOR COMPUTER FILE INTEGRITY AND BASELINE MAINTENANCE

The present invention relates to computer file integrity and baseline maintenance. More particularly, the present invention relates to computer file integrity and baseline maintenance in a networked environment.

BACKGROUND OF THE INVENTION

Ensuring the integrity of files and maintaining a baseline file system on a computer are constant problems. Attacks by malicious code, as well as inadvertent corruption by operating systems, other files, etc. provide a less than ideal environment for maintaining file integrity and maintaining a baseline system. Attacks by malicious users, such as hackers, as well as authorized changes by authorized users, e.g. disgruntled employees, may also violate file integrity and the system baseline. Moreover, maintaining appropriate updates of computer files leaves yet another area of file integrity and baseline maintenance for the user. For example, various iterations of Microsoft Windows contain a registry necessary to properly operate a computer system, yet updates may corrupt the registry when not properly integrated in the registry after installation.

Mechanisms do exist in the art for attempting to ensure file ("file" as used hereinafter generally includes files, data, code and microcode, e.g. firmware and the like) integrity and baseline maintenance for a system. For example, antivirus or other similar packages attempt to protect the system or network from hostile, malicious, predetermined and/or proscribed code (generally referred to hereinafter as "proscribed code.") VFIND®, from CyberSoft, Inc., is one such product that protects systems and networks from proscribed code. Any stand alone antivirus programs, such as VFIND®, usually need to be run by the user, however, and run frequently, otherwise the protections offered by the programs are lost. Also, these programs do not generally intercept proscribed code as the code is transferred from machine to machine, nor do these programs protect against hostile or unauthorized access to a machine or network.

Similarly, updating programs attempt to ensure the integrity of files on computer systems. The difficulties with updating systems arise, however, because updating systems are often program specific, and must be run for each program the user wants to update. This is a cumbersome task that may be put off by the user. Those updating programs that are not program specific, i.e. that purport to provide updating to the files on the user's system, may also have difficulties, because general updating programs are often restricted to a specific database of programs, and if any program is not present on the database, it will not be updated.

Accordingly, it is an object of the present invention to provide apparatus, methods and articles of manufacture for computer file integrity and baseline maintenance in a networked environment.

SUMMARY OF THE INVENTION

The present invention comprises apparatus, methods and articles of manufacture for file integrity and baseline maintenance on a computer system or systems. In the preferred embodiments, an MD5 hash is constructed of each file that the user desires to maintain.

Additionally, other hashes as known in the art may be used, such as MD4 or SHA1 as well as a CRC or combinations of hashes. The construction of the hash may be on a predetermined basis, such as scheduling, on a real time basis, or may be initiated by an antivirus or baseline program. In some embodiments, it should be noted, a predetermined hash may be provided.

The hash is stored in a secure area, which may or may not be on the user system. Periodically, or when desired, a new hash of the maintained file is generated and compared to the stored hash. If the comparison is true, that is, if the hashes are equal, the result is noted in a log and no further action is taken. If the comparison is false, that is, if the hashes are not equal, the comparison program notifies an alarm component.

The alarm component sends, across a network, and/or to a file server, notification that it is seeking a replacement for the file, along with a hash code identifying the file. This notification may be delayed, such as when the system is unable to access the network. When the alarm is picked up by one or more machines on the network, those machines respond by first, determining from their own database of hashed files if they have the file, and next, responding with the appropriate file.

When the file is received by the requesting system, the system hashes the file, check the hash against its original stored hash, and proceeds to install the file if the hash comparison is true. In the especially preferred embodiments, this is done in a secure area on the system. If the hash comparison does not prove true, then the cycle of alarm and response may be repeated.

In such a manner, the preferred embodiments may use an unknown and/or untrusted source to furnish a trusted result. However, if desired, certain sources may be preferred, or become identified as preferred, through a log, and so those sources would be checked for the file first. A results log may also be maintained, which includes successful maintenance attempts.

In the especially preferred embodiments, the user request is anonymous, so that the requesting machine is not readily identifiable.

DETAILED DESCRIPTION OF THE PREFERRED EMBODIMENTS

The present invention comprises apparatus, methods and articles of manufacture for maintaining computer file integrity and baseline maintenance in a networked environment. Although the present invention can be implemented on any platform known in the art, the preferred embodiments are used in UNIX® and various Windows® environments, such as XP 200, NT®, 2000, 95, 98 and ME®, as well as other UNIX® and UNIX®-like platforms, including SYSTEM V, SUN SOLARIS®, IBM AIX®, HP-UX®, LINUX® and its variants, as well as other operating system platforms including but not limited to IBM OS/390®, MacOS, VXWORKS® and others. (Trademarks are the property of their respective owners.) Moreover, those skilled in the art will appreciate that the invention may be practiced with other electronic device and computer system configurations, including hand-held devices, cell phones and other wired and wireless communication devices, digital audio and video devices, distributed computing environments, multi-processor systems, and microprocessor-based or programmable consumer electronics, such as smart printers, network PCs, minicomputers, mainframe computers, and the like.

In the preferred embodiments, a maintenance system is installed on a client. Here, the word "client" is used to define the system requesting the update. It should be noted that a system can be both a client and a server. The maintenance system is comprised of: a client maintainance_manager and one or more client maintenance_index file(s). (Of course, the file names may differ in different embodiments.)

The client maintenance_manager performs various functions as set forth below. The client maintenance_index file may be of variable size, and is comprised of one or more data information records of files on the system. The files included may be all files on the system files, or another desired set of files. Each record is comprised of, in the preferred embodiment, as:

file_name (which, for example, may be the same as a directory entry if one exists for the file, a program supplied name, e.g. when anonymity is desired, a derivative or meta file name, and/or other desired file identifiers. A file_name may also be a descriptor of a logical group of data such as when an area of RAM or other logical group of data has been isolated in order to be checked for file integrity,)

a hash or CRC of the file, which is, in the preferred embodiments, a MD5 hash, although other hashes as known in the art may be used, such as MD4 or SHA1 as well as a CRC or combination thereof. Also it should be noted that special cases can arise in which a file may have multiple valid hash codes. For example, if a logical group of data in RAM has been isolated in order to check for file integrity, it may have a number of discrete states, and therefore a multiple valid hash codes.

The records contain these fields in the following format: file_name:hash.

Further description on these fields is presented below. There may be one or more of these maintenance_index files in various embodiments, and fields and order of fields may be changed from that described above as desired. For example, in the especially preferred embodiments, one maintenance_index file may contain information on all the products desired to be maintained, and the file is securely stored on the system, e.g. through encryption, hidden partitions, password protection, etc. In other embodiments, more than one maintenance_index files may be present on the user's and/or other machines, and cross checks done among the versions as desired to ensure that file integrity is maintained. In yet other embodiments, the maintenance_index may refer to other maintenance_index files. This referential maintenance_index file structure may provide a hierarchical tree structure and use a single maintenance_index file to define an entire set of files for updates.

The client maintenance_manager is initially responsible for constructing the maintenance_index file(s). In the preferred embodiments, this construction is only done when the client is in a secured state, that is, when the files are known. In other embodiments, the maintenance_index file may be presupplied, as is described in further detail below. In yet other embodiments, the initial client state is disregarded, and an initial security maintenance performed, as is described in further detail below.

The client maintenance_manager is also responsible for running file integrity checks on a desired basis. Each file integrity check constructs a record for a file on the system. It also should be noted that a file integrity check may be made of fewer than all the files on a system. Such as check may be made of files predetermined by the user and/or administrator or selected by another method.

The record resulting from the file integrity check is then compared against the maintenance_index record of the same file. A number of actions may be taken depending upon the result of the comparison:

If the file name and hash code are the same; the file is presumed secure and no further action is taken;

If the file name and hash code differ; the file is presumed insecure, and a retrieval module of the maintenance_manager is initiated.

If a file is missing, then a client file check is performed. The client file check checks for the existence of a file with the same hash code as the missing file. If such a file is found, its existence is noted, and the user or other appropriate administrator is notified that the file name may have been inappropriately changed. If such a file is not found, the lack of a file with a hash code may lead to a user alert, and/or other actions may be taken.

Additionally, a report may be generated upon the internal comparison.

As had been noted above, in some embodiments, the maintenance_index file may be presupplied. Thus, lists of hash codes or preconfigured database(s) of hash codes for example could be provided as a convenient means to update, install or alter the system to a specific configuration.

The retrieval module of maintenance_manager broadcasts, over a network connection or connections, a signal indicating it needs the file or files that the maintenance_manager has presumed is insecure, and/or missing. Such a signal may be broadcast over a connection reserved for it in some embodiments, in other embodiments, the signal may be broadcast over a general use channel, e.g. the Internet. The retrieval module does not, in the especially preferred embodiments, direct its signal to any particular machine, aside from those that are running a receive signal module of the embodiment, which is further described below, although it may so direct if desired. It should be noted that it is possible in some embodiments that the signal be disguised, e.g. the server may not even know a client system is looking for a file or files.

The signal is received by one or more servers, which may be systems, file servers, network attached storage devices, storage applications, etc. It should be noted that the server may be of a different operating system type than the client machine. The server does not have to be preidentified as trusted, and may be in fact, entirely invisible to the client, as the client may be to the server. Indeed, in certain embodiments, a hash code and initial requesting signal may be the only transferred information. The preferred embodiments may use an unknown or untrusted source to furnish a trusted result. However, if desired, certain servers may be identified, or become identified as preferred, and so those servers would be desirable.

Once a server or servers receives the signal from the client, the systems respond by first, determining from their own database of hashed files if they have the file, and next, responding with the appropriate file. The server side database of hashed files may be predetermined, generated when desired, etc.

If a copy of the requested file is returned to the client from a server, the client hashes the file, and checks the hash against its stored hash database. If more than one copy is returned, the client will usually accept the first received and refuse the remainder. Alternatively, it may decide which to accept. If the hash comparison is true, the client will reinstall the file. In other embodiments, used in file installation and/or updating, a hash database may be supplied to or be present on the client that contains hashes of files to be installed and/or updated. Thus, any files obtained from a source would have their hash checked against that database in order to be installed and/or updated.

If the hash comparison does not prove true, then the cycle of alarm and response is repeated with another server, and the first server may be noted as providing an inappropriate file. A database of inaccurate servers as well as a database of accurate servers may be kept and used to refine further requests. Additionally, a log of successful installations may be maintained as well. Additionally, in some embodiments, the client hash database may be updated for new files installed on the system, or otherwise as desired. Thus, the client hash database does not have to be a static database in all embodiments.

If the requested file is not returned to the client within a number of broadcast/receipt cycles, or if only untrusted files have been returned within a number of cycles, then the system may utilize alternative means of obtaining the file such as a restore.

Additionally, the system may disinfect the original file using a tool such as MVFilter available from CyberSoft, Inc. The number of broadcast/receipt cycles may be predetermined by the user and/or administrator.

In some embodiments, the same system may act as both client and server. Thus, the system may refer to an internal file server, such as when a file name has been inappropriately changed, a file has been corrupted in a crash, etc. In a loopback type embodiment, for example, regular file integrity checks may be made of files in a system that are likely to be corrupted during system operation. If corrupted, the request would be then of the internal system server without the need to access a network.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

I claim:

1. A method of ensuring file integrity on a computer system in a networked environment that includes a plurality of computing components to be secured comprising:
    hashing a file and obtaining a first hash code for said file;
    storing on said system a second hash code wherein said second hash code corresponds with a baseline integrity condition;
    comparing said first hash code for said file to said stored second hash code, wherein said stored second hash code securely preexists on said system, said stored second hash code being stored in a secure area;
    maintaining the integrity of the computer system by requesting a copy of said file from a server if said comparison is false by sending with said request a notification that the request seeks a replacement for the file and a hash code identifying the file, wherein the hash code identifying the file corresponds with the second hash code;
    receiving said copy of said file from said server;
    hashing said copy of said file and obtaining a third hash code for said copy of said file;
    comparing said third hash code for said copy of said file to said stored second hash code;
    and, installing said copy of said file if said second comparison is true to return said computer system to an integrity condition corresponding to a baseline wherein said second hash code corresponds with said file;
    wherein said second hash code is static for said integrity condition;
    wherein at least a plurality of computers on said network are secured by an integrity condition corresponding to said baseline; and
    wherein the method identifies the integrity condition of a plurality of computers on the network through the comparison with said second hash code to determine whether the files on said plurality of computing components to be secured are secure.

2. A method as in claim 1 wherein said stored second hash code is stored in a database comprising a plurality of stored hash codes wherein said database of stored hash codes comprises aggregate data comprising hash codes for a set of files to be secured and maintained within the network environment, wherein said set of files to be secured and maintained include files on different computing components that have different files stored thereon but which include at least some files that are to be securely maintained to represent an integrity condition, and wherein said database of stored hash codes corresponds with files on a plurality of computers on the network.

3. A method as in claim 2 wherein said database comprising a plurality of stored hash codes is presupplied to said computer system.

4. A method as in claim 1 wherein hashing a file and obtaining a first hash code for said file further comprises hashing a file and obtaining an MD5 hash code for said file.

5. A method as in claim 1 wherein hashing a file and obtaining a first hash code for said file occurs on a predetermined basis.

6. A method as in claim 1 further comprising comparing said first hash code for said file to a stored second hash code and logging the results.

7. A method as in claim 1 wherein requesting a copy of said file from a server if said comparison is false further comprises requesting a copy of said file from a server over a network if said comparison is false.

8. A method as in claim 1 wherein requesting a copy of said file from a server if said comparison is false further comprises anonymously requesting a copy of said file from a server over a network if said comparison is false.

9. A method as in claim 1 wherein requesting a copy of said file from a server if said comparison is false further comprises requesting a copy of said file from an unknown server over a network if said comparison is false.

10. A method as in claim 1 wherein said requesting a copy of said file from a server if said comparison is false further comprises requesting a copy of said file from a server if said comparison is false, using said stored second hash code and an initial requesting signal.

11. A method as in claim 1, wherein said baseline is dynamically provided, and wherein said second hash code is stored in at least one maintenance index file that comprises a reference index file or a hierarchical index file, and wherein said maintenance index file is cross checked with one or more other maintenance index file that is a reference index file to confirm that it corresponds with an integrity condition.

12. A method as in claim 11, wherein said baseline is generated using cross-checks among computing components on the network and wherein said stored hash representing said baseline integrity condition for said plurality of computing components is constructed from cross-checks among computing components on the network by comparing a first maintenance index file of one computing component to a second maintenance index file of another computing component, and wherein said at least one of said first and second maintenance index files is hierarchical in relation to the other of said at least one of said first and second maintenance index files.

13. A method as in claim 1, wherein said baseline integrity condition corresponds with a hierarchical tree structure and wherein the method includes creating a plurality of maintenance index files, providing a single maintenance index file to define an entire set of files for said baseline integrity condition, and wherein the method further includes carrying out cross checks among one or more maintenance index files, wherein each said hierarchical maintenance index file is referential relative to at least one or more other maintenance index files.

14. A method of ensuring file integrity on a computer system in a networked environment that includes a plurality of computing components to be secured, the method comprising: providing a maintenance index file and securely storing said maintenance index file on at least one computing component; hashing a file and obtaining a first hash code for said file; comparing said first hash code for said file to a second stored hash code wherein said stored second hash code securely preexists on said system and is stored within said maintenance index file; anonymously requesting a copy of said file from an unknown server, over a network, if said comparison is false;
receiving said copy of said file from said unknown server; hashing said copy of said file and obtaining a third hash code for said copy of said file; comparing said third hash code for said copy of said file to said second hash code for said file; and, installing said copy of said file if said second comparison is true.

15. A method as in claim 14 further comprising logging said server that provided said copy of said file when said second comparison resulted in a true value, and refining further anonymous requests for a copy of said file based on the result of said returned true value.

16. A method as in claim 14 further comprising logging said server that provided said copy of said file when said second comparison resulted in a false value, and refining further anonymous requests for a copy of said file based on the result of said returned false value.

17. A method as in claim 14 wherein anonymously requesting a copy of said file from an unknown server, over a network, if said comparison is false further comprises anonymously requesting a copy of said file from an unknown server, over a network, if said comparison is false, using said second stored hash code and an initial requesting signal.

18. An apparatus for ensuring file integrity on a computer system comprising a networked environment of a plurality of computing components to be secured, the apparatus comprising: means including computer hardware containing software programmed with instructions for hashing a file and obtaining a first hash code for said file; means including software programmed with instructions for securely storing a maintenance index file on at least one computing component; means including software programmed with instructions for comparing said first hash code for said file to a stored second hash cod; wherein said stored second hash code securely preexists on said system and corresponds with a baseline integrity condition, said stored second hash code being stored in a secure area and being stored as part of a maintenance index file; means including software programmed with instructions for requesting a copy of said file from a server if said comparison is false; means including software programmed with instructions for receiving said copy of said file from said server; means including software programmed with instructions for hashing said copy of said file and obtaining a third hash code for said copy of said file; means including software programmed with instructions for comparing said third hash code for said copy of said file to said stored second hash code for said file; and, means including software programmed with instructions for installing said copy of said file if said comparison is true;
wherein said baseline integrity condition corresponds with a plurality of computing components;
wherein said secured stored second hash codes are contained in more than one maintenance index file, and said more than one maintenance index file is provided on at least two of said plurality of computing components of said networked environment;
wherein said software is programmed with instructions for implementing cross checks among said second hash codes stored in said maintenance index files, and
wherein at least one of said more than one maintenance index files hierarchical relative to at least another of the at least one of said more than one maintenance index files.

19. An apparatus as in claim 18 wherein said stored second hash code is stored in a database comprising a plurality of hash codes.

20. An apparatus as in claim 19 wherein said database comprising a plurality of hash codes is presupplied to said computer system.

21. An apparatus as in claim 18 wherein said means including software programmed with instructions for hashing a file and obtaining a first hash code for said file further comprises means for hashing a file and obtaining an MD5 hash code for said file.

22. An apparatus as in claim 18 wherein said means including software programmed with instructions for hashing a file and obtaining a hash code for said file hashes said file on a predetermined basis.

23. An apparatus as in claim 18 wherein said means including software programmed with instructions for comparing said first hash code for said file to a stored second hash code further comprises means for logging the results.

24. An apparatus as in claim 18 wherein said means including software programmed with instructions for requesting a copy of said file from a server if said comparison is false further comprises means including software programmed with instructions for requesting a copy of said file from a server over a network if said comparison is false.

25. An apparatus as in claim 18 wherein said means including software programmed with instructions for requesting a copy of said file from a server if said comparison is false further comprises means including software programmed with instructions for anonymously requesting a copy of said file from a server over a network if said comparison is false.

26. An apparatus as in claim 18 wherein said means including software programmed with instructions for requesting a copy of said file from a server if said comparison is false further comprises means including software programmed with instructions for requesting a copy of said file from an unknown server over a network if said comparison is false.

27. An apparatus as in claim 18 wherein said means including software programmed with instructions for requesting a copy of said file from a server if said comparison is false further comprises said stored second hash code and an initial requesting signal.

28. An apparatus for ensuring file integrity on a computer system comprising: means including computer hardware containing software programmed with instructions for hashing a file and obtaining a first hash code for said file; means for comparing said first hash code for said file to a second hash code wherein said second hash code securely preexists on said system, said second hash code being stored in a secure area; means for anonymously requesting a copy of said file from an unknown server, over a network, if said comparison is false; means for receiving said copy of said file from said server; means for hashing said copy of said file and obtaining a third hash code for said copy of said file; means for comparing said third hash code for said copy of said file to said second hash code for said file; and, means for installing a copy of said file if said second comparison is true.

29. An apparatus as in claim 28 further comprising means including software programmed with instructions for logging said server that provided said copy of said file when said second comparison resulted in a true value, and means for refining further anonymous requests for a copy of said file based on the result of said returned true value.

30. An apparatus as in claim 28 further comprising means including software programmed with instructions for logging said server that provided said copy of said file when said second comparison resulted in a false value, and means for refining further anonymous requests for a copy of said file based on the result of said returned true value.

31. An apparatus as in claim 28 further comprising means including software programmed with instructions for anonymously requesting a copy of said file from an unknown server, over a network, if said comparison is false further comprises said second stored hash code and an initial requesting signal.

32. A computer storage media comprising: means including computer hardware containing software programmed with instructions for hashing a file and obtaining a first hash code for said file; means including software programmed with instructions for securely storing a maintenance index file on at least one computing component means for comparing said first hash code for said file to a stored second hash code wherein said second hash code securely preexists on said system and is stored in said maintenance index file; means for anonymously requesting a copy of said file from an unknown server, over a network, if said comparison is false, wherein the means for anonymously requesting a copy of said file generates a request comprising said stored second hash code and an initial requesting signal; means for receiving said copy of said file from said server; means for hashing said copy of said file and obtaining a third hash code for said copy of said file; means for comparing said third hash code for said copy of said file to said second hash code for said file; and, means for installing said copy of said file if said second comparison is true.

33. A method of ensuring file integrity on a computer system comprising:
  providing a client maintenance manager for maintaining files on the computer system;
  constructing with said client maintenance manager a maintenance index file that contains information identifying products that are desired to be maintained said maintenance index file including a file name corresponding with a file;
  securely storing said maintenance index file on a storage component of the computer system;
  securely storing on a storage component of the computer system a second hash code for a file wherein said second hash code is stored in said maintenance index file, said maintenance index file containing the second hash codes for the files that are to be securely maintained and wherein said maintenance index file comprises file records, wherein each record contains a file name and the corresponding second hash value;
  analyzing the integrity of the files identified by said client maintenance index with said client maintenance manager by:
  hashing a file and obtaining a first hash code for said file;
  comparing said first hash code for said file to said stored second hash code corresponding with said file name, wherein said stored second hash code securely preexists on a storage component of said system, said maintenance index file containing said stored second hash code being stored in a secure area; and,
  if said comparison is false, initiating a retrieval module of the client maintenance manager and determining with said client maintenance manager whether said file is missing, wherein the retrieval module includes an alarm component;
  determining with said client maintenance manager whether a file exists that has the same hash code as the missing file but that has a different file name including sending with said alarm component a notification across a network that the client maintenance manger is seeking a replacement for the missing file;
  receiving with a network component a notification from said alarm component and determining from a database of hashed files of said network if the file is present, wherein said database of hashed file of said network comprises said records in said maintenance index file;
  responding to said alarm component with said file that corresponds with said missing file;
  reporting the name of any file which has the same hash code as said missing file.

34. The method of claim 33, wherein the network component comprises another computer on said network.

35. The method of claim 33, wherein said network component comprises a file server.

36. A method of ensuring file integrity on a computer system in a networked environment that includes a plurality of computing components to be secured, the method comprising:
  constructing a hash of each file in a group of files that is desired to be maintained;
  assigning to said hash one of the files of a plurality of computing components on said network wherein said hash represents hash, wherein said hash serves as an integrity value for said computing components that are to be secured, wherein said group of files to be maintained includes at least one or more files that are present on at least one computing component which are not present on at least one other computing component;
  storing on at least one system component a maintenance index file containing said hash representing said baseline integrity condition for said plurality of computing components, wherein said hash representing said baseline integrity condition for said plurality of components contains records comprising file names and corresponding hash values for more than one computing component, and includes records of file names and hash values for files that are not on each computing component, wherein said hash values contained in said maintenance index file represent a baseline integrity condition for more than one computing component;
  determining a second hash value for said group of files;
  comparing said second hash value to said stored hash representing said baseline integrity condition for the computing component;
  alerting of a deviation of the file set of the network component files that are to be secured based on said comparison.

* * * * *